United States Patent
Wu

(10) Patent No.: US 10,078,434 B2
(45) Date of Patent: Sep. 18, 2018

(54) METHOD AND APPARATUS FOR TAKING SCREENSHOT OF SCREEN OF APPLICATION IN MOBILE TERMINAL

(71) Applicant: HUAWEI DEVICE (SHENZHEN) CO., LTD., Shenzhen (CN)

(72) Inventor: Weibin Wu, Beijing (CN)

(73) Assignee: HUAWEI DEVICE (SHENZHEN) CO., LTD., Shenzhen (CN)

( * ) Notice: Subject to any disclaimer, the term of this patent is extended or adjusted under 35 U.S.C. 154(b) by 599 days.

(21) Appl. No.: 14/262,171

(22) Filed: Apr. 25, 2014

(65) Prior Publication Data

US 2014/0237405 A1   Aug. 21, 2014

Related U.S. Application Data

(63) Continuation of application No. PCT/CN2012/083012, filed on Oct. 16, 2012.

(30) Foreign Application Priority Data

Oct. 26, 2011   (CN) .......................... 2011 1 0329295

(51) Int. Cl.
   *G06F 3/0484*   (2013.01)
   *G06F 9/451*   (2018.01)

(52) U.S. Cl.
   CPC .......... *G06F 3/04845* (2013.01); *G06F 9/451* (2018.02)

(58) Field of Classification Search
   None
   See application file for complete search history.

(56) References Cited

U.S. PATENT DOCUMENTS

| 5,731,813 A * | 3/1998 | O'Rourke ............. G06F 3/0481 715/775 |
| 2002/0169784 A1* | 11/2002 | Cha .................... G06F 17/30327 |
| 2006/0161847 A1* | 7/2006 | Holecek ................ G06F 3/0481 715/716 |
| 2007/0094675 A1 | 4/2007 | Ryan |
| 2007/0118800 A1* | 5/2007 | Moore ............. G06F 17/30056 715/730 |

(Continued)

FOREIGN PATENT DOCUMENTS

| CN | 1976339 A | 6/2007 |
| CN | 101075172 A | 11/2007 |

(Continued)

OTHER PUBLICATIONS https://web.archive.org/web/20040917003850/http://www.math.uni-hamburg.de/doc/java/tutorial/uiswing/events/windowlistener.html, "how to Write window listeners", Sep. 17, 2004, 6 pages.*

(Continued)

*Primary Examiner* — Tuan S Nguyen
*Assistant Examiner* — Haimei Jiang
(74) *Attorney, Agent, or Firm* — Slater Matsil, LLP

(57) ABSTRACT

The present invention relates to the field of mobile terminals and discloses a method and an apparatus for taking a screenshot of a screen of an application. An instruction is received for closing a screen of a designated application. A designated area of the screen of the designated application is captured to obtain a screenshot of the designated area. The screenshot of the designated area is saved and the screen of the designated application is closed.

12 Claims, 3 Drawing Sheets

(56) References Cited

U.S. PATENT DOCUMENTS

| | | | |
|---|---|---|---|
| 2008/0109753 A1* | 5/2008 | Karstens | G06F 9/4443 715/802 |
| 2008/0177994 A1* | 7/2008 | Mayer | G06F 9/4418 713/2 |
| 2009/0083668 A1 | 3/2009 | Aizawa et al. | |
| 2009/0249189 A1 | 10/2009 | Jania et al. | |
| 2010/0017746 A1* | 1/2010 | Husoy | G06F 9/4443 715/781 |
| 2010/0164995 A1* | 7/2010 | Choi | G06T 1/00 345/667 |
| 2011/0083185 A1 | 4/2011 | Sheleheda et al. | |
| 2011/0113427 A1* | 5/2011 | Dotan | G06F 9/455 718/1 |
| 2011/0173627 A1 | 7/2011 | Murakami et al. | |
| 2011/0258486 A1* | 10/2011 | Bhogal | G06F 11/1438 714/15 |
| 2012/0081375 A1* | 4/2012 | Robert | G06F 17/30126 345/522 |

FOREIGN PATENT DOCUMENTS

| | | |
|---|---|---|
| CN | 101078980 A | 11/2007 |
| CN | 101122857 A | 2/2008 |
| CN | 101383889 A | 3/2009 |
| CN | 101477440 A | 7/2009 |
| CN | 101655808 A | 2/2010 |
| CN | 102521020 A | 6/2012 |
| JP | 2008117181 A | 5/2008 |
| KR | 20100092613 A | 8/2010 |
| WO | 2010027089 A1 | 3/2010 |

OTHER PUBLICATIONS http://stackoverflow.com/questions/7520076/how-not-to-allow-the-ios-from-taking-a-screen-capture-of-your-app-before-going-i, "how not to allow the iOS from taking a screen capture of your app before going into background", Sep. 22, 2011, 4 pages.* http://www.javaworld.com/article/2071755/learn-java/capture-the-screen.html, Capture Screen Javaworld, Apr. 24, 2006, Jeff Friesen, 13 pages.*

"Take Screenshot at specified resolution", http://stackoverflow.com/questions/6760996/take-screenshot-at-specified-resolution, Jul. 21, 2011, 2 pages.*

"ShareX" http://store.steampowered.com/app/400040/, release date Oct. 15, 2007, 2 pages.*

"Screen capture—get a screen capture of a figure frame or component", "https://www.mathworks.com/matlabcentral/fileexchange/24323-screencapture-get-a-screen-capture-of-a-figure-frame-or-component?requestedDomain=www.mathworks.com", Jun. 1, 2009, 7 pages.*

"Next Year's Smartphone Turn Out This Way? See the New Features of Antroid 4.0," Kadokawa Corporation, ASCII.jp, http://ascii.jp/elem/000/000/643/643618, Oct. 19, 2011, 3 pages.

"Next Year's Smartphone Turn Out This Way? See the New Features of Antroid 4.0," Kadokawa Corporation, ASCII.jp, http://ascii.jp/elem/000/000/643/643618/index-2.html, Oct. 19, 2011, 2 pages.

Singh, T., "Android 3.0 HoneyComb Features, Screenshots," Geeknizer, http://geeknizer.com/android-3-0-honeycomb-features-screenshots, Jan. 27, 2011, 6 pages.

"Optimus Pad," Impress Japan Corporation, 1st Edition, Jun. 11, 2011, pp. 10 & 29.

Seo, D., "'Extreme makeover' ice cream sandwich, What has been changed?," iT dongA, http://it.donga.com/7117/, Oct. 21, 2011, 7 pages.

* cited by examiner

METHOD AND APPARATUS FOR TAKING SCREENSHOT OF SCREEN OF APPLICATION IN MOBILE TERMINAL

This application is a continuation of International Application No. PCT/CN2012/083012, filed on Oct. 16, 2012, which claims priority to Chinese Patent Application No. 201110329295.3, filed on Oct. 26, 2011, both of which are hereby incorporated by reference in their entireties.

TECHNICAL FIELD

The present invention relates to the field of mobile terminals and, in particular embodiments, to a method and an apparatus for taking a screenshot of a screen of an application in a mobile terminal.

BACKGROUND

With the development of mobile terminals, most smartphones have an Android system installed. Android is an open-source software platform of Google for developing mobile programs, and includes an operating system, middleware, and some key applications. Activity is a standard component of the Android platform. In fact, an Activity is a single screen in an application, which is inherited from the Activity class, and displays a UI formed by Views and responds to events.

SUMMARY OF THE INVENTION

The inventor finds, after analysis of the prior art, that the prior art has at least the following disadvantages. In the prior art, during management of application scenarios such as a task manager and a Home desktop application program on the Android platform, only screens of applications running in background can be obtained and screens of all history applications cannot be obtained. As a result, a user cannot easily find an application to be switched to, and therefore a UI (User Interface) is not of much effect during application switching, leading to indirect display and poor user experience.

Embodiments of the present invention provide a method and an apparatus for taking a screenshot of a screen of an application in a mobile terminal. Technical solutions are described below.

A method for taking a screenshot of a screen of an application can be used with a mobile terminal. An instruction for closing a screen of a designated application is received. A designated area of the screen of the designated application is captured to obtain a screenshot of the designated area. The screenshot of the designated area and say and the screen of the designated application is closed.

An apparatus for taking a screenshot of a screen of an application in a mobile terminal is also provided. A receiving module is configured to receive an instruction for closing a screen of a designated application. A screenshot module is configured to capture a designated area of the screen of the designated application to obtain a screenshot of the designated area. A sending module is configured to save the screenshot of the designated area and to close the screen of the designated application.

The technical solutions provided in the embodiments of the present invention have the following beneficial effects. Before an Activity of an application is closed and when the window of the Activity is still visible, a screenshot of the screen of the application is taken to obtain the last real screen of the Activity. In this way, high memory usage that is caused by taking a screenshot after the screen of the application is closed is avoided. Therefore the screen capturing efficiency is improved and memory usage and the number of invocation times are reduced.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the embodiments of the present invention are described in further detail below with reference to the accompanying drawings.

Before the method for taking a screenshot of a screen of an application that is provided in the present invention is introduced, basic knowledge for the present invention is briefly introduced first.

Activity is a standard component of the Android platform. In fact, an Activity is a single screen in an application, which is inherited from the Activity class, and displays a UI formed by Views and responds to events.

History Activity refers to Activities once started by a user, including Activities in a task running in background.

SurfaceView is a special view class of the Android platform. It is the parent class of two 3D view classes GLSurfaceView and RSSurfaceView. The two 3D view classes both run on their independent drawing threads. Therefore, SurfaceView is different from other common view classes.

Live Wallpaper refers to a live wallpaper of the Android platform, which is generally implemented by the RSSurfaceView view class.

ActivityManagerService refers to an Activity management service, which is a key system service on the Android platform.

WindowManagerService refers to a Window management service, which is a key system service on the Android platform.

TaskManager refers to a task manager, which is an Android application program with functions such as task displaying, switching, and killing.

Figure 1:
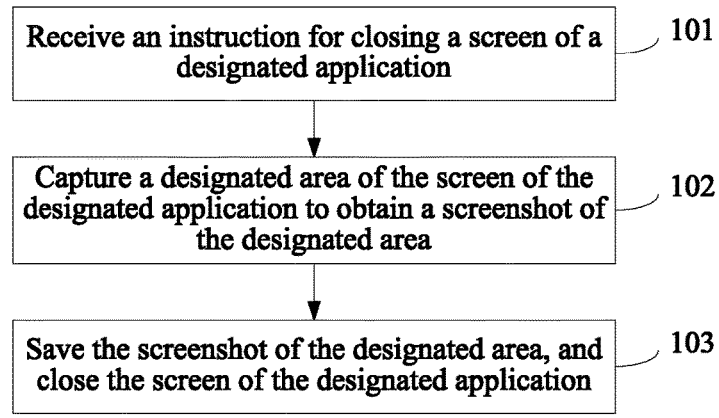
FIG. 1 is a flowchart of a method for taking a screenshot of a screen of an application in a mobile terminal according to an embodiment of the present invention.

FIG. 1 is a flowchart of a method for taking a screenshot of a screen of an application in a mobile terminal according to an embodiment of the present invention. This embodiment is executed by a mobile terminal. Referring to FIG. 1, this embodiment specifically includes the following steps.

101. Receive an instruction for closing a screen of a designated application.

In this embodiment, at least one application runs on the mobile terminal, and the application may be in a full-screen state currently. The instruction for closing the screen of the designated application is a switching instruction for switching the designated application to running in background, or a switching instruction for switching another application to running in foreground, or a closing instruction for closing the designated application. When the instruction is the switching instruction for switching the designated application to running in background, the instruction may be triggered manually by a user of the mobile terminal, and is for example, minimizing the designated application. The instruction may also be triggered according to a preset condition. For example, if a designated application is in an idle state for 20 minutes, the switching instruction for switching the designated application to running in background is triggered.

A person skilled in the art may know that the lifecycle of an Activity of an application includes: When an Activity is started, and after a constructor function of Activity( ) is executed, a system invokes an onCreate( ) method to set a global state and resources of the Activity in the onCreate( )method, and then invokes an onStart( )method. After the onStart( ) method is executed, the Activity is still visible on screen. An onResume( ) method is executed, at this time the Activity is in a wait window event in a loop. When the window is partially visible, that is, the Activity is not in front, an onFreeze( ) method of the Activity is invoked, where this method maintains some internal states of the Activity. Then, the window is paused until the Activity comes to the front again, and the onResume( ) method of the Activity is invoked. If the window of the Activity is invisible, it indicates that an onStop( ) method of the Activity is invoked. An onRestart( ) method of the Activity is not invoked until the window of the Activity is closed, and then the onStart( ) method is repeated. When the system recycles resources or a finish( ) method of the Activity is invoked, the Activity is stopped, and onDestroy( ) is invoked to release resources occupied by the Activity.

102. Capture a designated area of the screen of the designated application to obtain a screenshot of the designated area.

In this embodiment, the designated area may be the entire screen of the application, or an area preset by the mobile terminal, which is not limited in this embodiment of the present invention. By performing screen capturing on the designated area, a view of a status bar may be obtained, and it may be further determined whether the screenshot includes the status bar as required.

It should be noted that step 102 of this embodiment is performed after the instruction for closing the screen of the designated application is received and before the screen of the designated application is closed. Compared with the description of the lifecycle of an Activity in the prior art in step 101, screen capturing in the prior art is performed after the onStop( )method is invoked, while screen capturing in the present invention is performed after an onPause( ) method is invoked and before the onStop( ) method is invoked.

103. Save the screenshot of the designated area, and close the screen of the designated application.

In this embodiment, after saving the screenshot of the designated area, the mobile terminal closes the screen of the designated application, and according to the received instruction, closes the designated application or switches the designated application to running in background.

After step 103, this embodiment further includes when an instruction for viewing the designated application is received, obtaining the screenshot of the designated area, and displaying the screenshot of the designated area.

In the method provided in this embodiment, before a screen Activity of an application is closed and when the window of the Activity is still visible, a screenshot of the screen of the application is taken to obtain the last real screen of the Activity. In this way, high memory usage that is caused by taking a screenshot after the screen of the application is closed is avoided, and therefore the screen capturing efficiency is improved, and memory usage and the number of invocation times is reduced.

Figure 2:
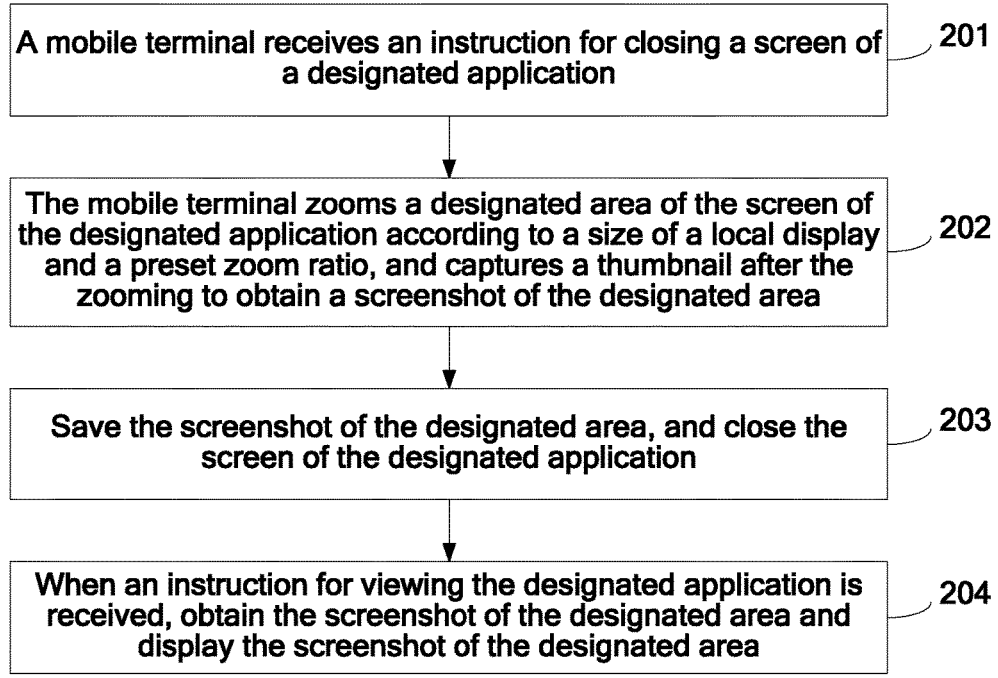
FIG. 2 is a flowchart of a method for taking a screenshot of a screen of an application in a mobile terminal according to an embodiment of the present invention.

FIG. 2 is a flowchart of a method for taking a screenshot of a screen of an application in a mobile terminal according to an embodiment of the present invention. This embodiment is executed by a mobile terminal, and a designated application is currently running on the mobile terminal. Referring to FIG. 2, this embodiment specifically includes the following steps.

201. A mobile terminal receives an instruction for closing a screen of a designated application.

The principle of step 201 is the same as that of step 101 which is not described herein again.

202. The mobile terminal zooms a designated area of the screen of the designated application according to a size of a local display and a preset zoom ratio, and captures a thumbnail after the zooming to obtain a screenshot of the designated area.

In this embodiment, the size of the local display refers to a size of a display of the mobile terminal. Generally, the size of the screen of an application is the same as the size of a local display, that is, an original size of a screenshot is the size of the local display. The designated area of the screen of the designated application may be set by a user of the mobile terminal according to a browsing habit, and the designated area may be a full-screen area of the screen of the designated application, or a certain area of the screen of the designated application. The preset zoom ratio is set by the user of the mobile terminal according to a browsing habit or the like, which is not specifically limited in this embodiment of the present invention. Step 202 specifically includes obtaining, by the mobile terminal, the size of the local display and the preset zoom ratio, and zooming the designated area of the screen of the designated application according to the preset zoom ratio by using the size of the local display as an original size of the screen of the designated application, so as to obtain the thumbnail after the zooming, and capturing the thumbnail after the zooming to obtain the screenshot of the designated area.

A specific method for taking a screenshot may be implemented by invoking drawFB( ) A person skilled in the art may know that drawFB( ) is a drawing method, and in this drawing method, a current image of a display is obtained by invoking a preset display device, a buffer pixel of the preset display device is read, and a Bitmap image is generated by using the buffer pixel. Because drawFB( ) uses the preset display device for drawing, a range of drawFB( ) also covers a status bar of the display, so that the screen capturing range is enlarged.

For example, the drawFB( ) function may specifically be expressed as follows:

```
static void drawFB(JNIEnv* env, jobject jcanvas, SkCanvas* canvas) {
    struct fb_var_screeninfo vinfo;
    int fd;
    int offset;
    int bpp;
    int size;
    int w;
    int h;
    unsigned i;
    unsigned bytespp;
    unsigned char* buf;
    fd = open("/dev/graphics/fb0", O_RDONLY);//Open an fb device
    if (fd < 0) {
        return;
    }
    if (ioctl(fd, FBIOGET_VSCREENINFO, &vinfo) < 0) {//Read
parameters of the fb device
        close(fd);
        return;
    }
    fcntl(fd, F_SETFD, FD_CLOEXEC);
    bytespp = vinfo.bits_per_pixel / 8;
    bpp = vinfo.bits_per_pixel;
    size = vinfo.xres * vinfo.yres * bytespp;
    w = vinfo.xres;
    h = vinfo.yres;
    /* HACK: for several of our 3d cores a specific alignment
     * is required so the start of the fb may not be an integer number of
     * lines from the base. As a result we are storing the additional
     * offset in xoffset. This is not the correct usage for xoffset, it should
     * be added to each line, not just once at the beginning
     */
    offset = vinfo.xoffset * bytespp;
    offset += vinfo.xres * vinfo.yoffset * bytespp;
    lseek(fd, offset, SEEK_SET);
    buf = (unsigned char*)malloc(size);
    if (buf == NULL) {
        close(fd);
        return;
    }
    memset(buf, 0, size);
    read(fd, buf, size);//Read fb pixel data
    SkBitmap* bitmap = new SkBitmap( ); //Create a bitmap
{
    SkAutoLockPixels alp(*bitmap);
    //Config KRGB_565_Config if one pixel is described by two Bytes
    if (TWO_BYTES == bytespp) {
        bitmap->setConfig(SkBitmap::kRGB_565_Config, w, h);
    } else {
        bitmap->setConfig(SkBitmap::kARGB_8888_Config, w, h);
    }
    bitmap->setPixels(buf);//Set pixel data of the bitmap as pixels
obtained from the fb device
    canvas->drawBitmap(*bitmap, 0, 0, NULL);//Draw a bitmap on a
    canvas
    close(fd);//Close the fb device
    free(buf);//Release buf memory
    bitmap->setPixels(NULL, NULL);//Release the pixel data
}
    delete bitmap; //Recycle the bitmap instance
}
```

203. Save the screenshot of the designated area, and close the screen of the designated application.

In this embodiment, the designated area of the screen of the designated application is captured to obtain the screenshot of the designated area, and after the screenshot of the designated area is saved, the screen of the designated application is closed. The step of closing the screen of the designated application is performed after the screenshot is taken, so that integrity and effectiveness of the screenshot are ensured, a blank screen caused by taking a screenshot after the screen of the designated application is closed is avoided, and screen capturing can be accurately performed for an Activity formed by GLSurfaceView class view elements or RSSurfaceView class view elements, or an Activity with a background of LiveWallpaper class wallpaper.

204. When an instruction for viewing the designated application is received, obtain the screenshot of the designated area, and display the screenshot of the designated area.

In this embodiment, the instruction for viewing the designated application may be an instruction for viewing a history application or an instruction for viewing an application running in background. The instruction may be triggered by starting a task manager of the mobile terminal. For example, when the task manager of the mobile terminal is started, a screenshot of a designated area of an application running in background is displayed and saved, so that a user of the mobile terminal can view the application running in background directly, and learn the last running state of the application running in background. The instruction may be for all history applications or applications running in background, or may be for a certain history application or an application running in background, which is not specifically limited in this embodiment of the present invention. In this embodiment, the mobile terminal may perform operations such as browsing, switching, and releasing on the designated application according to a received operational instruction. Browsing refers to viewing the last running state of the designated application, switching refers to switching the designated application from running in foreground to running in background or switching the designated application from running in background to running in foreground, and releasing refers to deleting the screenshot of the designated area of the designated application.

The foregoing embodiment may be applied to an embedded product that uses the Android platform, such as a tablet computer, a set top box, or a fixed station.

Figure 3:
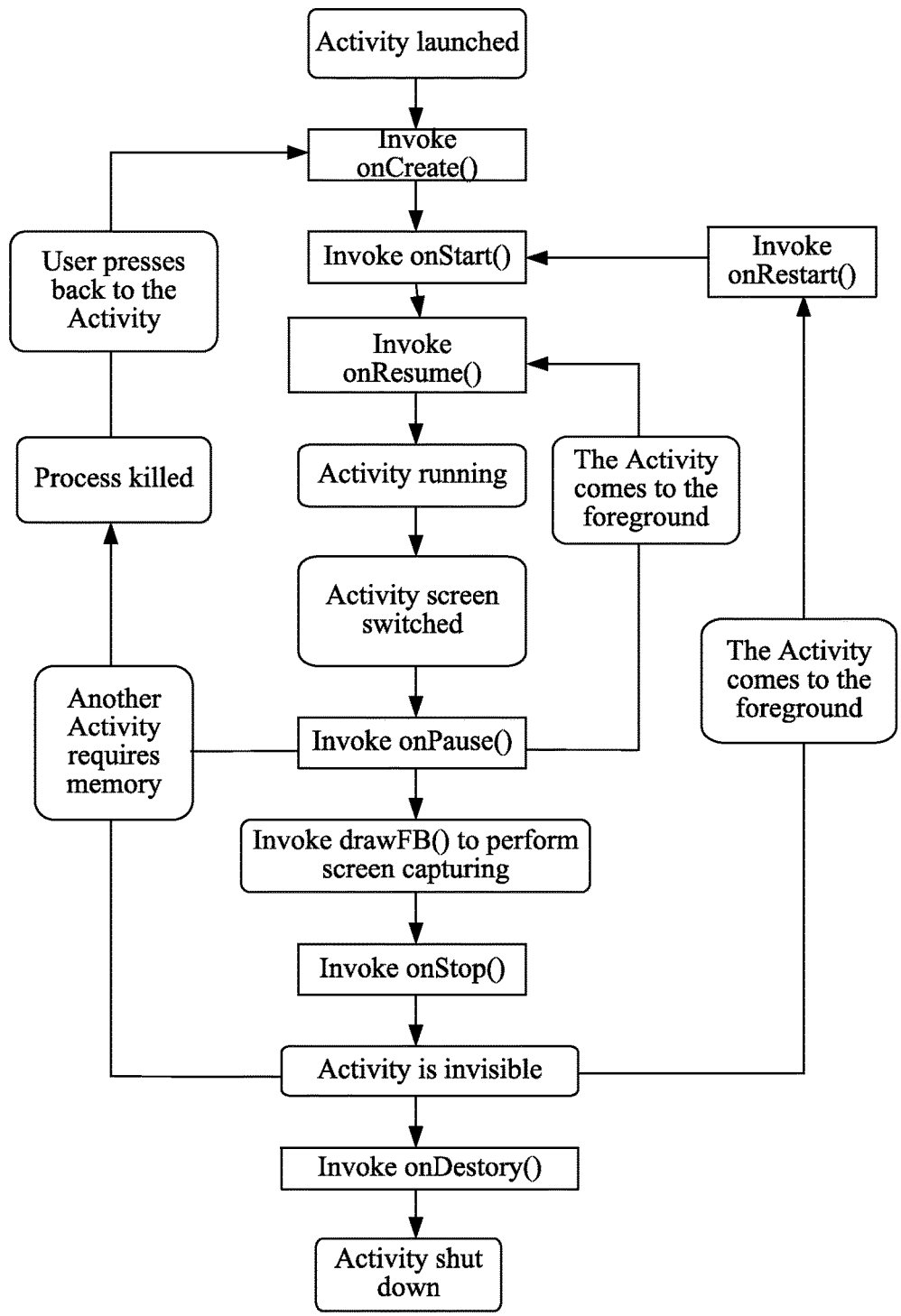
FIG. 3 is a flowchart of an example, in a Java environment, of a method for taking a screenshot of a screen of an application in a mobile terminal according to an embodiment of the present invention.

For example, in the prior art, when a new Activity comes to the foreground, a previous Activity enters an onPause( ) life state, and at this time, the old Activity is still visible. When the window of the old Activity is invisible, the old Activity enters an onStop( ) life state. A screen capturing algorithm of the Android platform is performing capturing in the onStop( ) life state, and because the window is invisible, it is required to redraw the old Activity to obtain a thumbnail of the screen. This not only leads to a low efficiency, but also makes it difficult to obtain the last real screen of the old Activity. Therefore, in this embodiment of the present invention, a screenshot is taken in the onPause( ) life state. Referring to FIG. 3, FIG. 3 is a flowchart of an example, in a JAVA environment, of a method for taking a screenshot of a screen of an application in a mobile terminal according to an embodiment of the present invention. onCreate( ), onStart( ), onRestart( ), onResume( ), drawFB( ), onPause( ), onStop( ), and onDestory( ) described in the present invention are all abstract functions which are not implemented specifically and need to be implemented by overriding in a specific application. The lifecycle of an Activity includes the following procedures: When an Activity is launched, onCreate( ), onStart( ) and onResume( ) are invoked sequentially, so that the Activity runs normally. When a screen of the Activity is switched, drawFB( ) is invoked to perform screen capturing, then onStop( ) is invoked, and at this time, the Activity is already invisible. Subsequently, any one of the following three conditions may occur: onDestory( ) is invoked, and the Activity is shut down; or, when another Activity requires memory, the process is killed, and onCreate( ) is invoked for the another Activity; or when the Activity comes to the foreground again, onRestart( ) is invoked.

According to the method provided in this embodiment, before an Activity of an application is closed and when the window of the Activity is still visible, a screenshot of the screen of the application is taken to obtain the last real screen of the Activity. In this way, high memory usage that is caused by taking a screenshot after the screen of the application is closed is avoided, and therefore the screen capturing efficiency is improved, and memory usage and the number of invocation times is reduced.

Figure 4:
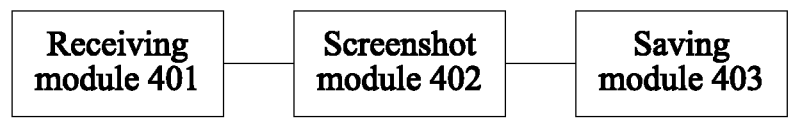
FIG. 4 is a schematic structural diagram of an apparatus for taking a screenshot of a screen of an application in a mobile terminal according to an embodiment of the present invention.

FIG. 4 is a schematic structural diagram of an apparatus for taking a screenshot of a screen of an application in a mobile terminal according to an embodiment of the present invention. Referring to FIG. 4, this embodiment includes a number of modules. A receiving module 401 is configured to receive an instruction for closing a screen of a designated application. A screenshot module 402 is configured to capture a designated area of the screen of the designated application to obtain a screenshot of the designated area. A saving module 403 is configured to save the screenshot of the designated area and to close the screen of the designated application.

The screenshot module 402 includes a zooming unit, which is configured to zoom the designated area of the screen of the designated application according to a size of a local display and a preset zoom ratio. The screenshot module 402 also includes a screenshot unit, which is configured to capture a thumbnail after the zooming to obtain the screenshot of the designated area.

The apparatus further includes a display module, which is configured to, when an instruction for viewing the designated application is received, obtain the screenshot of the designated area, and to display the screenshot of the designated area.

The instruction for closing the screen of the designated application is a switching instruction for switching the designated application to running in background, or a switching instruction for switching another application to running in foreground, or a closing instruction for closing the designated application.

The apparatus provided in this embodiment may specifically be a mobile terminal, and is based on the same conception as the method embodiments. For the specific implementation procedure of the apparatus, reference may be made to the method embodiment for details, which are not described herein again.

All or a part of the foregoing technical solutions provided by the embodiments of the present invention may be implemented by a program instructing relevant hardware. The program may be stored in a readable storage medium. The storage medium includes any medium that can store program code, such as a ROM, a RAM, a magnetic disk, or an optical disc.

The foregoing descriptions are merely exemplary embodiments of the present invention, but are not intended to limit the present invention. Any modifications, equivalent replacements, or improvements made within the spirit and principles of the present invention shall fall within the protection scope of the present invention.

What is claimed is:

1. A method for taking a screenshot of an application, implemented by a mobile terminal, the method comprising:
    displaying an application on a display of the mobile terminal;
    receiving an instruction for switching an application state of the application to running in background with a screen of the application closed;
    zooming a designated area of the screen of the designated application according to a size of the display and a preset zoom ratio;
    capturing a thumbnail after the zooming;
    obtaining a screenshot of the designated area thumbnail, including a status bar of the display, by invoking a drawFB( ) method in response to the receiving the instruction for switching the designated application state, after an onPause method is invoked, and before an onStop method is invoked, wherein the drawFB( ) method is a drawing method that obtains a current image of a display invoking a preset display device, reading a buffer pixel of the preset display device is read, and generating a bitmap image using the buffer pixel, and wherein the drawFB( ) method has a range that includes the status bar of the display;
    storing the screenshot of the designated application and switching the designated application state to running in background;
    receiving an instruction for viewing an application running in background; and
    displaying the screenshot of the application in response to the receiving the instruction for viewing the application running in background.

2. The method according to claim 1, the method further comprising displaying the screen of the application when the onPause method is invoked.

3. The method according to claim 1, wherein the designated area of the screen of the application is an entire screen of the application.

4. The method according to claim 1, the method further comprising:
    receiving an operational instruction; and
    switching the designated application state from running in background to running in foreground according to the operational instruction.

5. A mobile terminal, comprising:
    a display;
    one or more processors; and
    a non-transitory computer-readable storage medium storing a first software application and a program to be executed by the processor, the program including instructions for:
    displaying the first software application on the display of the mobile terminal;
    receiving an instruction for switching an application state of the first software application to running in background with a screen of the designated application closed;
    zooming a designated area of the screen of the designated application according to a size of the display and a preset zoom ratio;
    capturing a thumbnail after the zooming;
    obtaining a screenshot of the designated area thumbnail, including a status bar of the display, by invoking a drawFB( ) method in response to the receiving the instruction for switching the application state, after an onPause method is invoked, and before an onStop method is invoked, wherein the drawFB( ) method is a drawing method that obtains a current image of a display invoking a preset display device, reading a buffer pixel of the preset display device is read, and generating a bitmap image using the buffer pixel, and wherein the drawFB( ) method has a range that includes the status bar of the display;

storing the screenshot of the first software application and switching the designated application state to running in background;

receiving an instruction for viewing an application running in background; and displaying the screenshot of the first software application in response to the receiving the instruction for viewing the designated application running in background.

6. The mobile terminal according to claim 5, the program further including instructions for displaying the screen of the application when the onPause method is invoked.

7. The mobile terminal according to claim 5, wherein the designated area of a screen of the application is an entire screen of the application.

8. The mobile terminal according to claim 5, the program further including instructions for:

receiving an operational instruction; and switching the designated application from running in background to running in foreground according to the operational instruction.

9. A non-transitory computer readable storage medium storing one or more programs, the one or more programs including instructions, which, when executed by a mobile terminal with a display, and one or more processors, cause the mobile terminal to:

display an application on the display of the mobile terminal;

receive an instruction for switching an application state of the application to running in background with a screen of the application closed;

zooming a designated area of the screen of the designated application according to a size of the display and a preset zoom ratio;

capturing a thumbnail after the zooming;

obtain a screenshot of the designated area thumbnail, including a status bar of the display, by invoking a drawFB( ) method in response to receiving the instruction for switching the application state, after an onPause method is invoked, and before an onStop method is invoked, wherein the drawFB( ) method is a drawing method that obtains a current image of a display invoking a preset display device, reading a buffer pixel of the preset display device is read, and generating a bitmap image using the buffer pixel, and wherein the drawFB( ) method has a range that includes the status bar of the display;

store the screenshot of the designated application and switch the designated application state to running in background;

receive an instruction for viewing an application running in background; and display the screenshot of the application in response to receiving the instruction for viewing the application running in background.

10. The computer readable storage medium according to claim 9, wherein the instructions further cause the mobile terminal to display the screen of the application when the onPause method is invoked.

11. The computer readable storage medium according to claim 9, wherein the designated area of a screen of the application is an entire screen of the application.

12. The computer readable storage medium according to claim 9, wherein the instructions further cause the mobile terminal to:

receive an operational instruction; and switch the designated application state from running in background to running in foreground according to the operational instruction.

* * * * *